Figure 1:
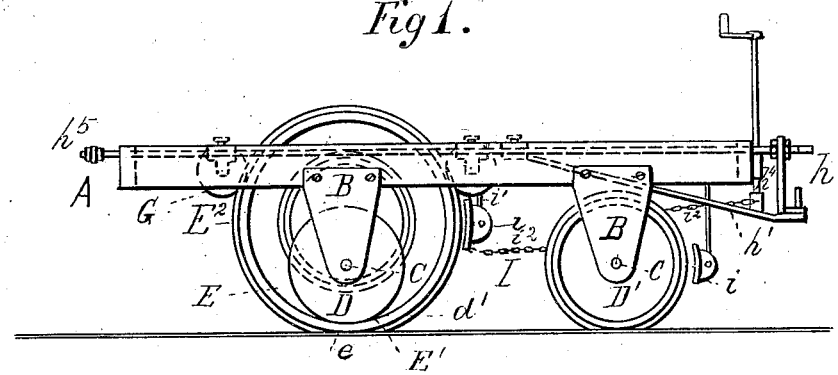

(No Model.) 6 Sheets—Sheet 1.

B. C. POLE.
Car Starter.

No. 237,697. Patented Feb. 15, 1881.

Witnesses.
John M. Gaughen
Thos Ourand

Inventor.
Benjamin C. Pole

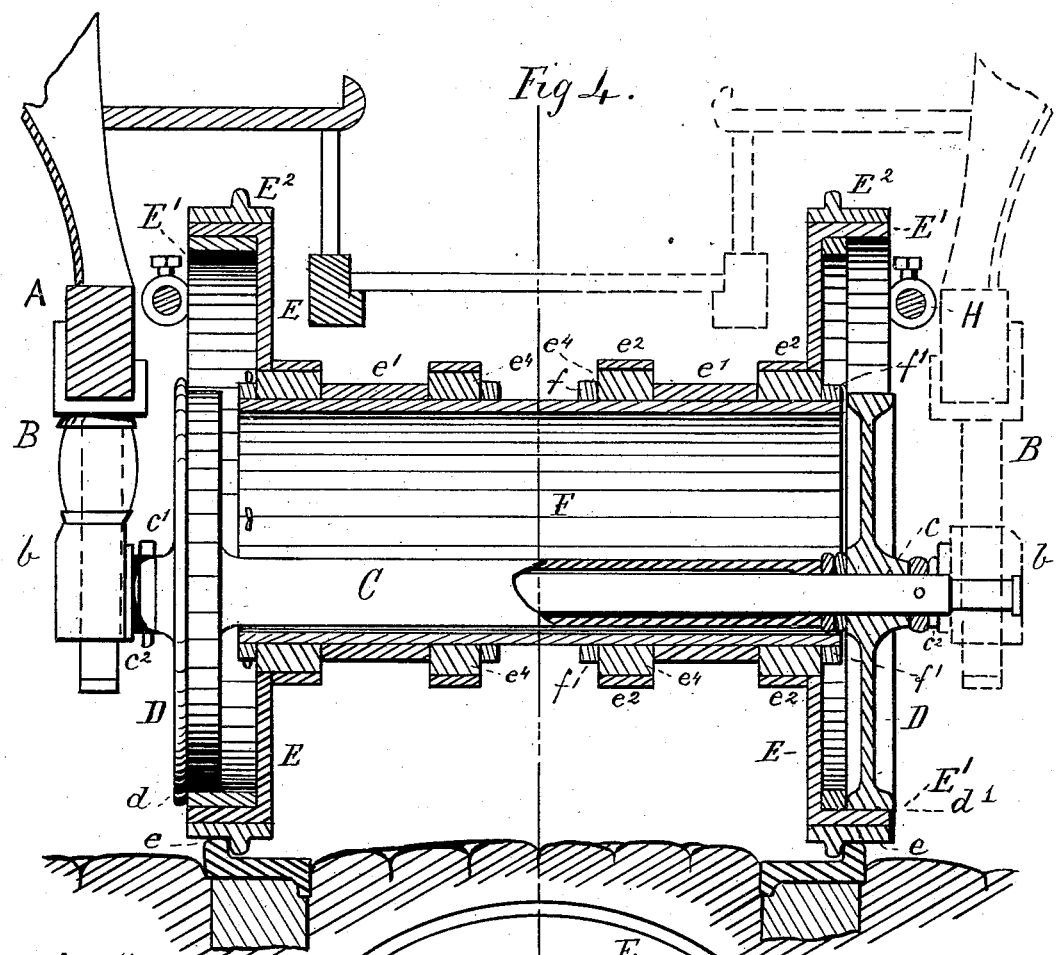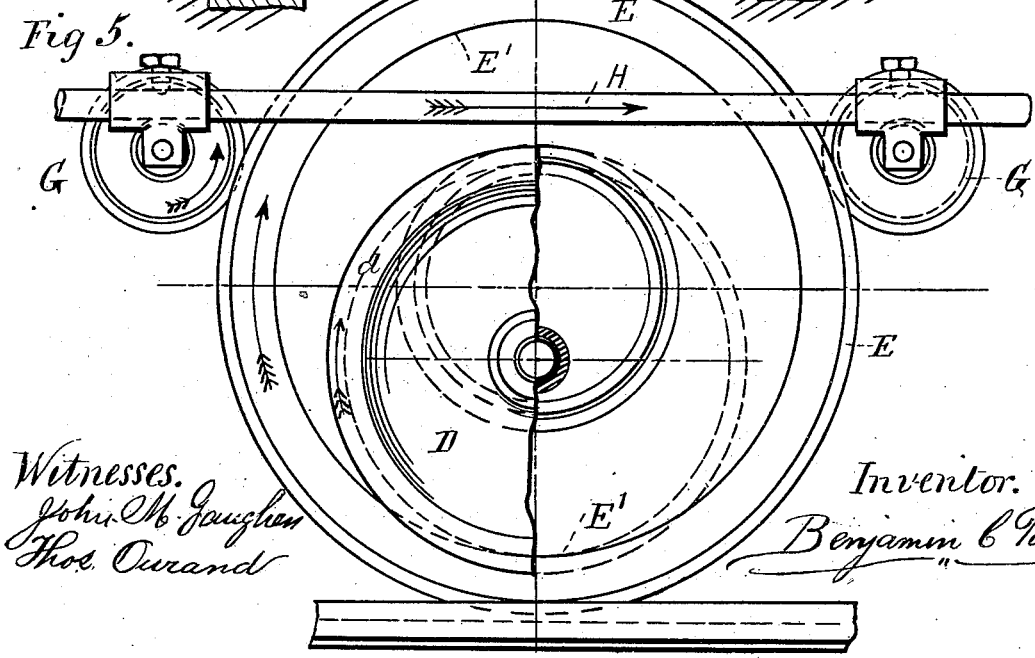

(No Model.) 6 Sheets—Sheet 3.

B. C. POLE.
Car Starter.

No. 237,697. Patented Feb. 15, 1881.

Witnesses.
Thos. Durand
H. A. Hall

Inventor.
Benjamin C. Pole (No Model.) 6 Sheets—Sheet 4.
B. C. POLE.
Car Starter.
No. 237,697. Patented Feb. 15, 1881.
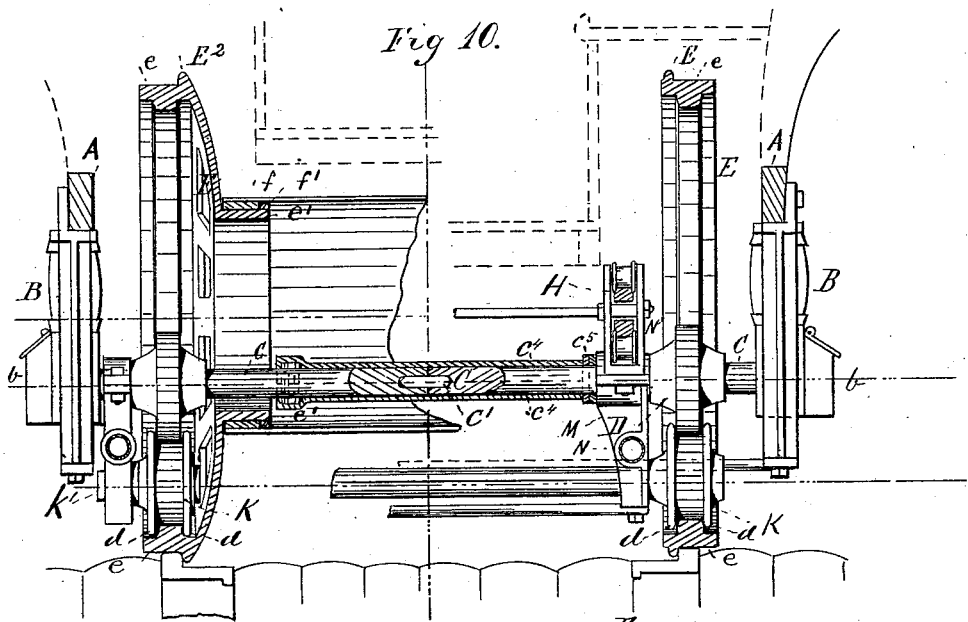
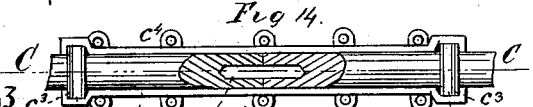
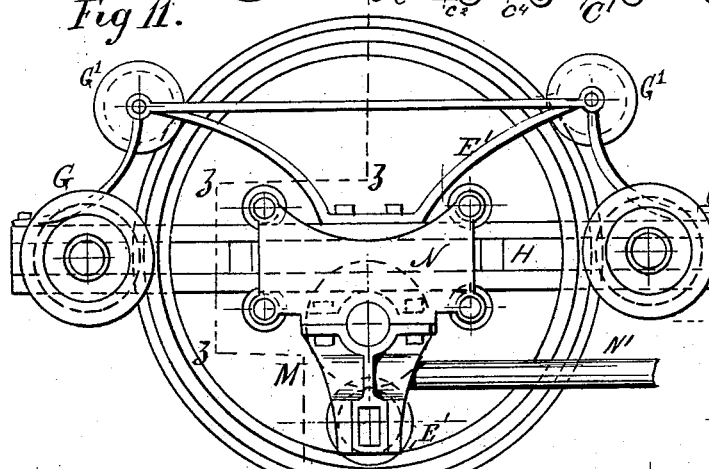
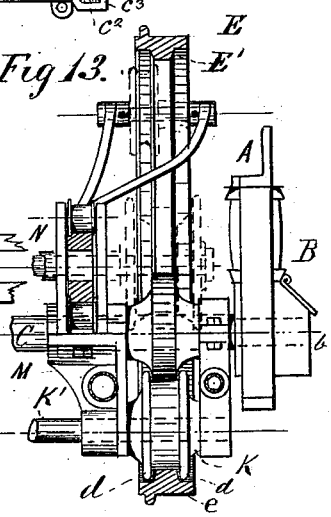
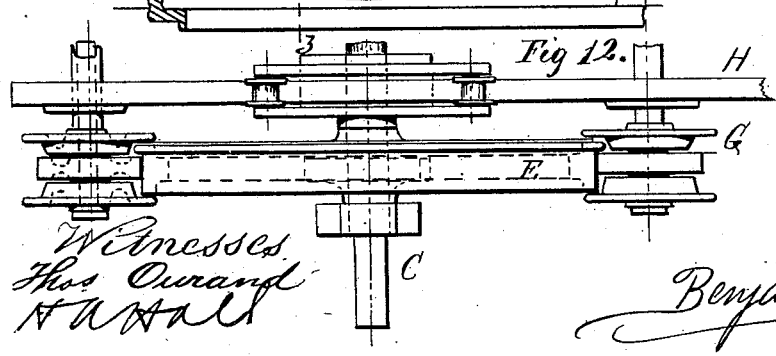
Witnesses
Thos Durand
N A Hall
Inventor
Benjamin C. Pole (No Model.)
B. C. POLE.
Car Starter.
No. 237,697.  Patented Feb. 15, 1881.
6 Sheets—Sheet 5
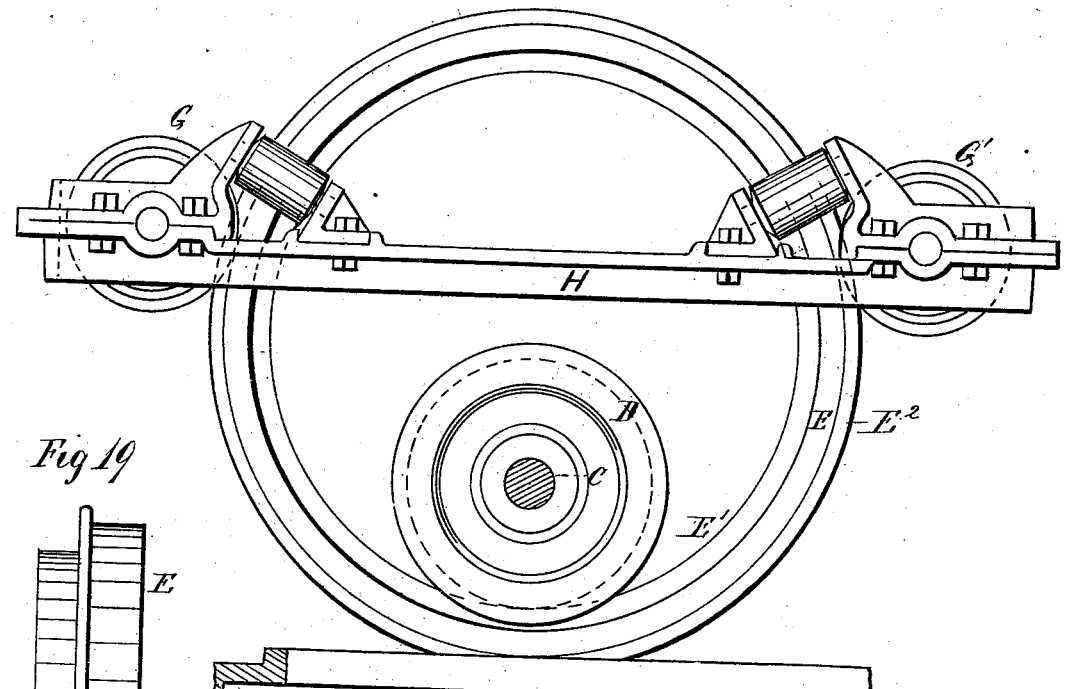
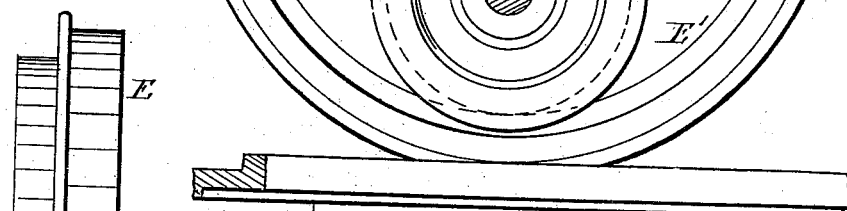
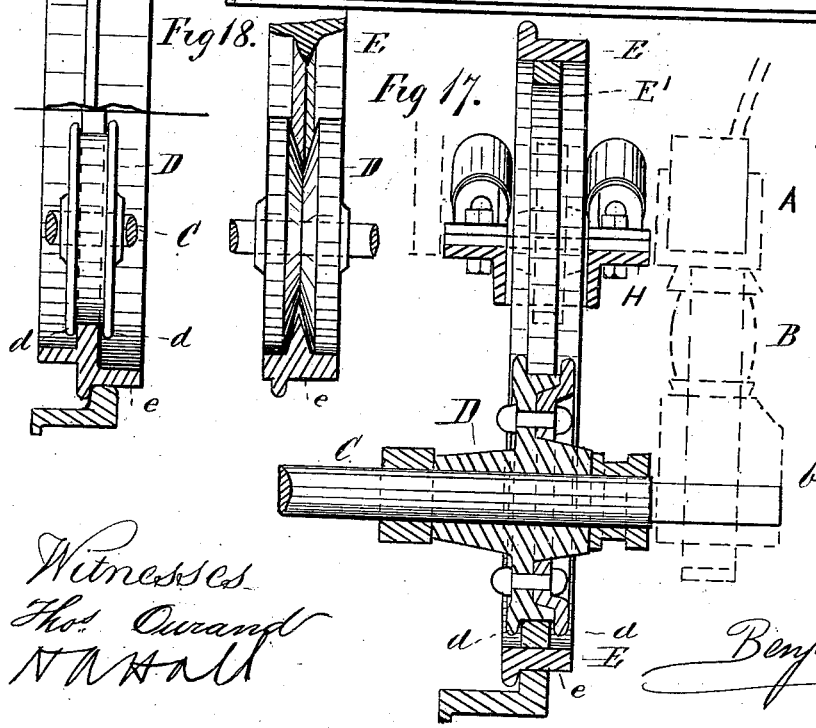
Witnesses
Thos Durand
N. W. Hall
Inventor.
Benjamin C. Pole (No Model.)
B. C. POLE.
Car Starter.
No. 237,697.
6 Sheets—Sheet 6.
Patented Feb. 15, 1881.
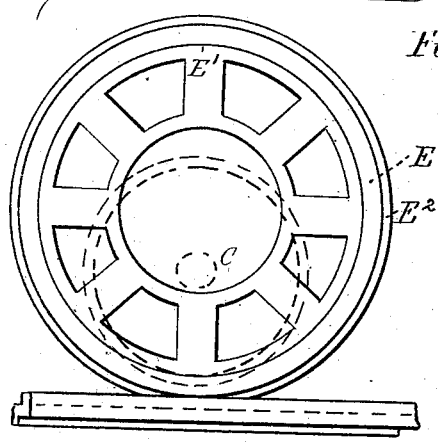 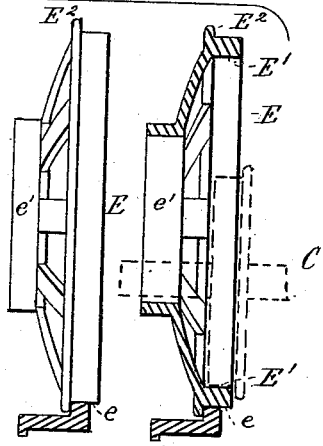
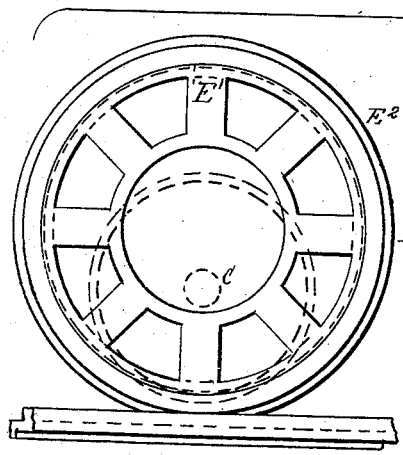 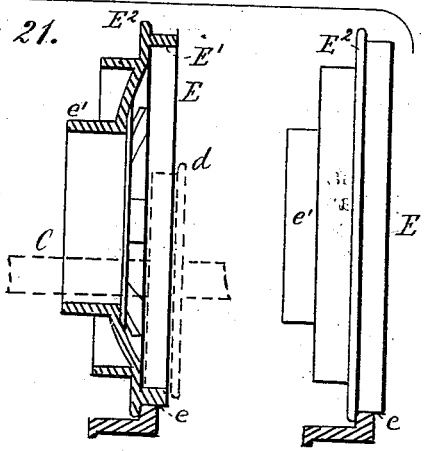
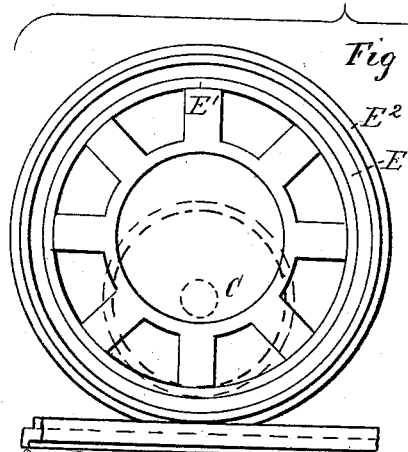 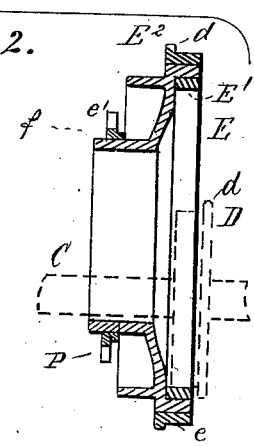  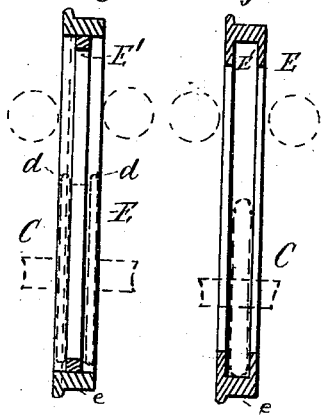
Witnesses.
Thos Durand
N A Hall
Inventor.
Benjamin C. Pole

UNITED STATES PATENT OFFICE.

BENJAMIN C. POLE, OF PHILADELPHIA, PENNSYLVANIA.

CAR-STARTER.

SPECIFICATION forming part of Letters Patent No. 237,697, dated February 15, 1881.

Application filed November 24, 1880. (No model.)

*To all whom it may concern:*

Be it known that I, BENJAMIN C. POLE, an engineer, and citizen of the United States, residing at Philadelphia, in the county of Philadelphia and State of Pennsylvania, have invented certain new and useful Improvements in Car or Vehicle Starters, to be called the "Differential-Lever Car-Starter"; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of improvements which have been made for the purpose of starting horse-cars or other vehicles; and the nature thereof is in providing certain constructions, hereinafter described, for the purpose above named, said improvement consisting in the application of leverage derived from the different or differing diameters of wheels, or rings and wheels; also, in utilizing the same leverage power for running, or during running, and in stopping; also, in a certain construction of the wheels or rings, to make them suitable for the purposes set forth; also, in providing the wheels with certain wearing parts, and means to replace those parts after they become worn out; also, in the construction of the devices used for the purpose of applying the power of the horses to the wheels; also, in a special construction for the purpose of allowing one wheel to revolve without the other on the opposite side; also, in devices to hold the ring up and guide the same in an upright position, with suitable strengthening-braces therefor; also, in providing friction-rollers to guide the rings or the wheels applied at the sides thereof.

Figure 2:
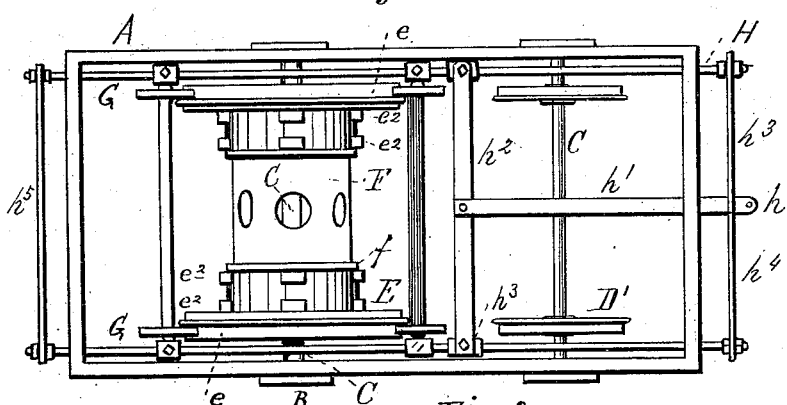
Figure 3:
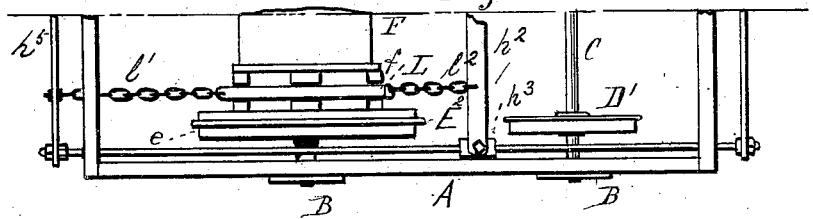
Figure 6:
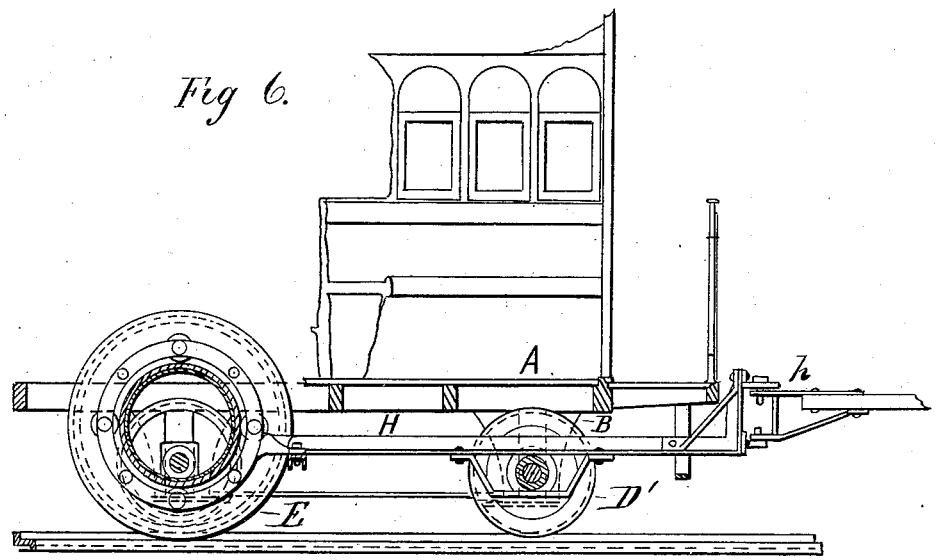
Figure 7:
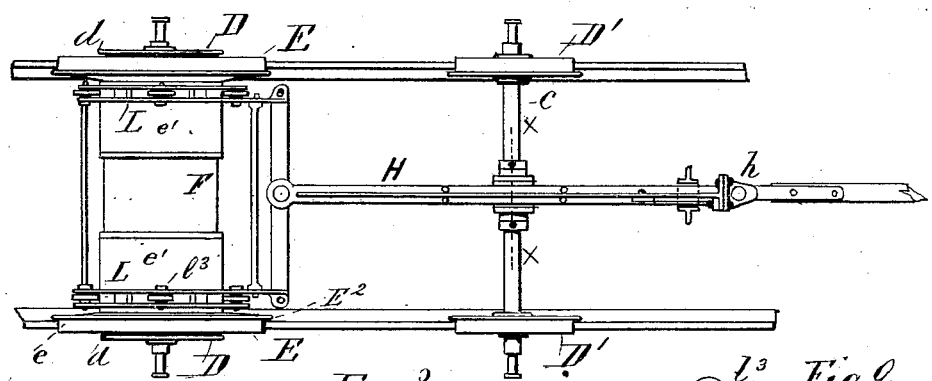
Figure 8:
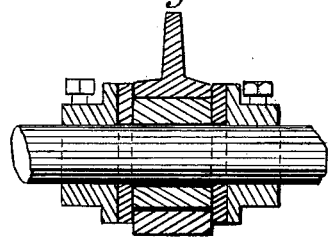
Figure 9:
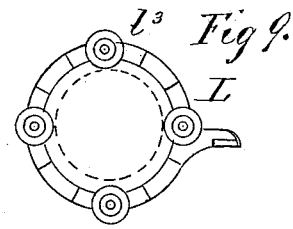

By reference to the drawings and letters of reference marked thereon, Figure 1 is a side elevation of the car-starter and part of the car-frame. Fig. 2 is a plan of Fig. 1. Fig. 3 is a plan of a modification, showing means of applying the horse-power to the starter. Fig. 4 is a cross-section of the car-starter, showing the position of the car and passenger-seats in dotted lines, also the position of the car-wheels in the car-starter. Fig. 5 is a part sectional side elevation of my car-starter, illustrating the direction of motion given by the horses on pulling the draw-rod. Fig. 6 is a side elevation of an equivalent means of applying the horse-power. Fig. 7 is a plan of Fig. 6. Fig. 8 is a cross-section on line *x x* of Fig. 7. Fig. 9 is a side view of strap with friction-rollers. Fig. 10 is a sectional elevation of my invention showing the starter-wheel and its position as against the starter-ring, and its position under a car. Fig. 11 is a side elevation of the rings as starters, with friction-wheels for sustaining and operating the same. Fig. 12 is a part plan of Fig. 11. Fig. 13 is a cross-sectional elevation through center of Fig. 11, on line *z z*. Fig. 14 is a sectional plan of car-axle modified. Fig. 15 is a cross-section of Fig. 14. Fig. 16 is a side elevation of a modification when rings are used for starters. Fig. 17 is a cross-section of Fig. 16. Fig. 18 represents a cross-section of the lower part of a ring starter, showing a V-shaped retaining-flange for interior car-wheel. Fig. 19 is a part sectional elevation of ring starter adjusted to have an exterior and interior tread-face, for the purpose of taking to the turn-outs or switches provided for this class of wheels. Fig. 20 is the front, side, and sectional elevation of the wheel starter. Fig. 21 is a front, side, and sectional elevation of the wheel starter adjusted, with interior face-flanges, to take the turn-outs, as in the ring, Fig. 19. Fig. 22 is a part sectional elevation of Fig. 21, showing wearing rings or tires provided for the wheel starter. Fig. 23 is a cross-section of a ring starter with interior removable rim for replacing as worn out. Fig. 24 is a cross-section of a ring starter adjusted to allow the car-wheel to run in a groove.

In all the figures the same letters refer to like parts.

The frame A of the horse-car or other vehicle is supported by the pedestals B. These pedestals B are provided with the ordinary springs and axle-boxes *b*, in which the journals of the axles C revolve. Upon these axles C, front and back, are the wheels D and D'. The rear wheels, D, are provided with flanges *d* in some instances, or are flat, as at *d'*, and are made to revolve upon the interior rim or ring, E', of the starter wheel or ring E. This wheel or ring E is arranged so as to take the track with a regular tread, $e$, and flange $E^2$, and when the wheel form is used there is an additional flange, $e'$. The flange $e'$ has a certain number of bearing-points, $e^2$. They extend out from the wheel, and into these bearing-points are placed wood or brass bearings, which guard against the wear and tear as the flange $e$ and its wheel E revolve upon the central hollow shaft or drum F whenever there is a curve in the road; but otherwise the drum F, with the flanges $e$ and wheel E, all revolve together, carrying with them the wheel D. Wheel D runs on the inside rim, E', as shown by the drawings, and the hollow drum F will have to be of sufficient size to allow the axle C of the wheel D to move freely around; and as the wheel D is of less diameter than the wheel E the hollow drum will have to be of an internal diameter sufficient for the axle C and clearance of the same.

To prevent the floor of the car being too much elevated above the ground, the diameter of the drum F can be made less, and yet retain the same diameter of wheel E, by inserting an additional wheel, K, between the wheel D and inside rim, E', of wheel E.

To hold the wheel E in position on the drum F, there are the rings $f$ and $f'$, or equivalents therefor. The wheels E are therefore independent of each other. By this construction the curves will not interfere with the easy motion of the car.

The axle C of the wheels D is divided, and arranged with the wheel D on one side keyed or shrunk on the axle C, at $c$, and the opposite wheel D, is either cast with a long boss or the shaft is divided in the middle, as shown in Figs. 10 and 11. In this latter construction both wheels are shrunk or keyed on the axle C, and the axle C is divided in the middle. Into the ends of this divided axle C, which adjoin, is placed a steel pin, $c'$, and near the wheels D there are pinned on collars $c^2 c^3$ over the whole of the center of the axle C, and collars $c^2 c^3$ are placed over the divided sleeve a pipe, $c^4$. This incases the collars and holds the shaft in position against a washer, $c^5$, placed at the ends of the sleeve. This sleeve is shown in Figs. 10, 14, and 15. In the long sleeve, as shown in Fig. 4, there are provided the pins $c'$ and washers $c^2$, and this construction permits the wheels D to move independently, as in the instance of an ordinary road-wagon, the construction being especially valuable in turning a curve.

At or near to the upper part of the wheel E there are provided friction-wheels G, and in some instances additional wheels G'. These wheels G have their bearings in or upon the draw-rod H, or its equivalent, and are forced against the tread-face $e$ of the wheel E, and by turning the wheels E the wheel D is forced up or made to climb up the interior rim, E', and the weight of the car and passengers, forcing the wheel D to the lowermost point of E, will, by leverage, move the car or other vehicle.

To attach the power of the horses to the draw-rod H there are provided the eye and stop $h$ to engage with the pole of the car when a pole is used. To support the eye and stop $h$ there is provided the central strut or brace, $h'$. This is carried to the cross-piece $h^2$, and the cross-piece $h^2$ is held on the rod H by bearings $h^3$, thus allowing the rod H to be drawn in or pushed out more or less on either side, thereby equalizing the strain of the starter on either wheel or ring E. On the front of the rod H there are cross-pieces $h^4$ and $h^5$, and such other cross-pieces as may be necessary to brace the same.

The brake I is made to operate upon the front wheels, D', of the car, and also to force back the starter-wheel E or ring E, thereby causing the wheel D to climb up in the wheel or ring E, thus stopping the car. The shoe $i$ of the brake I is hung on the frame A by the swinging links $i'$, and the chain $i^2$ winds the shoe up, first against the front wheels, D', and then against the wheel E. However, by driving the horses with breechings they could hold back on the starter and stop the car; also, in case of the horses falling the car would at once stop, as the leverage would be thrown back on the wheel D. Springs replace the brake-shoes or carry them away from the wheels D' and E. The brakes should be supplied whether the horses are driven with breechings or not. The operation of braking is gentle, yet effective, and not liable to lock the wheels, as the weight on the car and its own weight will regulate the amount of distance to which it would be possible to push the wheel E back on the wheel D, or, more properly, the height which wheel D would climb up in wheel E on its interior rim, E'.

The operation of the apparatus is as follows: The horses (or other power, as a steam or air engine, may be used) pulling upon the rods H or rings E, cause the wheel D to be elevated, and act as a lever upon the ring E. The horses pulling on the rods H, one rod being on each side of the car, or, as shown in Figs. 1, 2, 3, 4, 5, 16, and 17, bring the friction-wheels G or G' against the wheel E, and revolving it, start the car; and as the power is distributed to both sides of the car the curves will not interfere, each set of wheels making independent revolutions on the track. The value of this leverage will be as a point taken at the contact-face of the wheel G or G' against the periphery of the wheels or rings E, and the distance between this point to the wheel D inside the rim of wheel or rings E, with a purchase taken upon the track, and the movement of the wheel D back up in wheel E will be the fulcrum or purchase.

The construction in the wheel or ring E, as herein set forth, will involve wear at the faces $e$ and E', and on these faces are provided additional tires or rims, and, as hereinbefore mentioned, the hollow drum F raises the car-floor too high. To lessen the diameter of this drum F, I must insert between the wheels or rings E and the wheel D an intermediate wheel, K, and shaft K', as shown in Figs. 10, 11, 12, and 13. They are supported by the guides and additional pedestals M and N. These pedestals are connected by a brace, N', to the front axle, thereby retaining the wheel K in its proper position directly underneath wheel D. Wheel D runs on wheel K, allowing it to revolve. The brace N' connects with the axle C, either inside the wheel D' or outside, between it and the pedestal B, and the brace M, holding the wheel K secure, allows wheel D to rest upon the top of wheel K, and, as the ring or wheel E is forced over the wheels K and D revolve. The greater the amount of free horizontal motion the ring E can be given—that is, the greatest distance to which it can be forced over—so much the more effective will be the leverage operating on either the wheel D or K, the ground being the purchase. When the wheel E and the intermediate wheel, K, are used, the axle K' is only a pin, $k$, on which the wheel K revolves. Also, in some instances, I use the band L, as shown in Figs. 3, 6, 7, and 9. It is provided with friction-rollers $l^3$ in place of the friction-wheel G, that is to operate the wheel E, and in this instance the rod H is carried out, and on its outer end are provided the eye and stop $h$ for the pole of the horse-car.

Suitable oiling-cups will be provided on and to the pedestals M and guide N, also for the other working parts of the starter; and friction-rollers will be placed on and against the rod H, that all, or nearly all, of the strain of the horses or other power shall be brought upon the axles of the wheels G or G' or rollers $i^3$ of the strap L, as the case may be.

Also, for the purpose of utilizing the leverage of my ring or wheels E, I anticipate placing on the same the teeth P, as shown in Fig. 22, these to be bolted onto the side of the ring or wheel and engage with like teeth or with an endless chain; but when an endless chain is used, then there will be two sets of teeth, P, to each wheel or ring E, for the purpose of running in either direction, ahead or backward; and when a pinion is used to engage with the wheel, that pinion must be provided with longitudinal motion to move along with the wheel as its upper end moves to compensate. Therefore the pinion would be guided with reference to the top of the wheel E and not the bottom or under side.

Having thus described the construction and operation of my invention, what I claim as new, and desire to secure by Letters Patent of the United States, is as follows:

1. A car or vehicle starter, runner, and brake consisting, essentially, of the wheels D and E, in combination with and operated by the wheels G, substantially as and for the purpose set forth.

2. In a car starter, runner, and brake, the combination of the wheels D, ring-wheels E, and friction-wheels G, with the frame H, through which power is applied to said friction and ring wheels, as set forth.

3. In a car starter, runner, and brake, the wheels D and E, provided with flanges to take the track and retain them in position, in combination with means for operating said wheels, substantially as shown and described.

4. In a car or vehicle starter, runner, and brake, the combination of the wheels D and E and axles F and C, with the device for imparting rotation to ring-wheels E by frictional contact with their peripheries, as set forth.

5. The combination, with a car or other vehicle body, of the draw rod or frame H, provided with frictional wheels G, for the purpose of imparting rotations to the supporting-wheels of said car or vehicle body, in the manner specified.

6. The draw rod or frame H, provided with friction-rollers G, and having cross-pieces and stay-brace $h'$, to sustain the pole of a car, in the manner shown and described.

7. The combination, with a car or other vehicle, of a starter, runner, and brake having the following elements, namely: ring-wheels, supporting-wheels within the ring-wheels, axles allowing independent movement to the supporting-wheels, and devices for imparting rotation to said ring-wheels, consisting of friction-wheels and a suitable draw-bar by which they are carried, all arranged for joint operation, in the manner set forth.

In testimony whereof I affix my signature in presence of two witnesses.

BENJAMIN C. POLE.

Witnesses:
H. A. HALL,
EDW. H. THOMAS.